United States Patent [19]
Nakajima et al.

[11] 3,750,634
[45] Aug. 7, 1973

[54] CRANKCASE VENTILATING SYSTEM FOR FUEL INJECTION TYPE INTERNAL COMBUSTION ENGINE

[75] Inventors: Yasuo Nakajima, Yukihiro Etoo, both of Yokohama, Japan

[73] Assignee: Nissan Motor Company, Limited, Yokohama City, Japan

[22] Filed: Oct. 22, 1970

[21] Appl. No.: 82,949

[30] Foreign Application Priority Data
Oct. 22, 1969  Japan........................... 44/84430

[52] U.S. Cl. ......................... 123/119 B, 123/41.86
[51] Int. Cl. ...................... F02f 9/00, F02m 25/06
[58] Field of Search ...................... 123/119 B, 41.86

[56] References Cited
UNITED STATES PATENTS

| | | | |
|---|---|---|---|
| 3,116,727 | 1/1964 | Dietrich | 123/119 B |
| 2,291,879 | 8/1942 | Chandler et al. | 123/119 B |
| 3,157,467 | 11/1964 | Daigh et al. | 123/119 B |
| 3,179,096 | 4/1965 | Linn | 123/119 B |
| 3,199,498 | 8/1965 | Schottyssek | 123/119 B |
| 3,157,467 | 11/1964 | Daigh et al. | 123/119 B |
| 3,241,535 | 3/1966 | Drysdale | 123/119 B |
| 3,280,808 | 10/1966 | Mosher et al. | 123/119 B |
| 3,364,910 | 1/1968 | Hulse | 123/119 B |
| 3,416,503 | 12/1968 | High | 123/119 B |

*Primary Examiner*—Wendell E. Burns
*Attorney*—McCarthy, Depaoli, O'Brien & Price

[57] ABSTRACT

A crankcase ventilating system adapted to effectively reduce the amount of hydrocarbon exhaust during idling and decleration. This system has a first conduit through which blow-by gases containing water and gasoline vapors in the crankcase enter the throttle chamber upstream of the throttle valve. The first conduit is provided with an orifice which controls the flow therethrough. A second conduit is provided to introduce fresh air from the air cleaner to the crankcase. During idling and deceleration the throttle valve is held in the fully closed position so that the blow-by gases are prevented from entering the engine. Under these conditions, only a small amount of blow-by gases is caused to flow into the air cleaner through the second conduit by an extremely small negative pressure existing in the air cleaner. Thus, the amount of hydrocarbon exhaust during idling and deceleration is remarkably reduced.

3 Claims, 7 Drawing Figures

CRANKCASE VENTILATING SYSTEM FOR FUEL INJECTION TYPE INTERNAL COMBUSTION ENGINE This invention relates to a crankcase ventilating system for a fuel injection type internal combustion engine and more particularly to such a system which is adapted to effectively reduce the amount of hydrocarbons emitted in automobile exhaust gases during idling and deceleration.

Recently, the air-pollution problem has made it necessary to prevent the crankcase vapors, that is, water and gasoline vapors from being discharged into the atmosphere. Nowadays, automobiles are equipped with closed-or shield-type crankcase ventilating system. However, the closed-type crankcase ventilating system has the disadvantage that during idling or under such an engine operating condition that a high vacuum exists in the intake manifold the blow-by gases circulating to the combustion cylinders are relatively large in quantity even for reduced intake air with the resultant increase in the amount of hydrocarbons contained in the intake air, whereby a misfire or irregular combustion is caused. In the shield-type crankcase ventilating system, on the other hand, the air cleaner element tends to quickly become dirty because of passage therethrough of the blow-by gases.

Furthermore, in the case where the crankcase ventilating system is installed on the engine of the type that is capable of reducing the fuel supply during deceleration, the sucked blow-by gases are discharged into the atmosphere without being reburned in the cylinders during the fuel supply reduction, thus increasing the amount of hydrocarbon exhaust. This requires various exhaust cleaning devices such as a blow-by control valve and a blow-by gas cutoff device to be mounted on the engine, which would inevitably increase the complexity of its construction.

It is, therefore, an object of this invention to provide a novel and improved crankcase ventilating system to overcome the above-stated disadvantages.

It is another object of this invention to provide a crankcase ventilating system adapted for use in a fuel injection type internal combustion engine and which is simple in construction.

It is still another object of this invention to provide a crankcase ventilating system, as above, which is effective in reducing the amount of hydrocarbons emitted in automobile exhaust gases during idling and deceleration.

Figure 1:
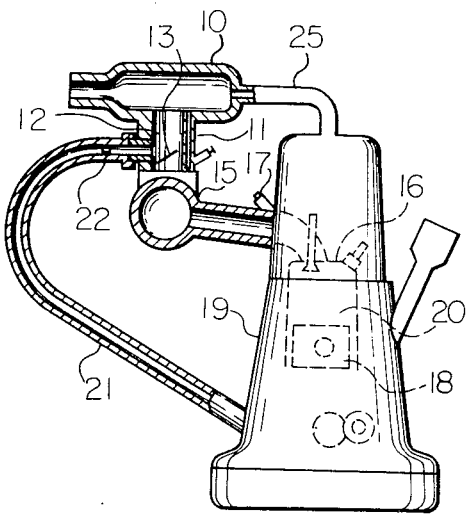
FIG. 1 is a schematic view, partly in section, of a crankcase ventilating system of this invention.
Figure 2:
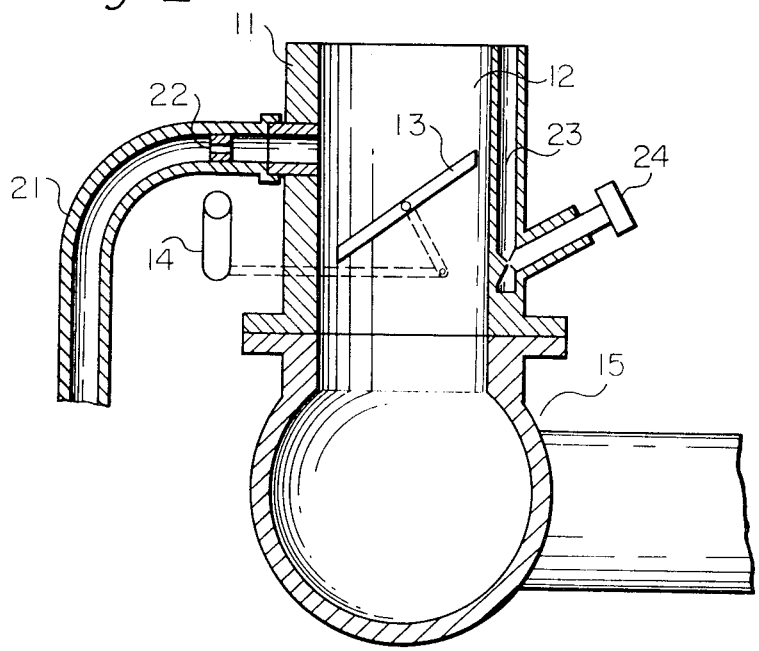
FIG. 2 is a fragmentary detailed view of the crankcase ventilating system shown in FIG. 1.

Referring first to FIG. 1, a fuel injection type internal combustion engine incorporating the present crankcase ventilating system is shown. The engine comprises an air cleaner 10 which is mounted on an air horn 11 defining therein a throttle chamber 12. As is best seen in FIG. 2, the throttle chamber 12 has a throttle valve 13 mounted therein which is operatively associated with an accelerator pedal (not shown) through a mechanical linkage 14. The throttle chamber 12 is provided upstream of an intake manifold 15 which communicates with the intake port of a combustion cylinder 16 of the engine. A fuel injection nozzle 17 is provided in the intake manifold 15 to spray fuel thereinto in a highly atomized form. While the nozzle 17 is shown as located in the intake manifold 15, it is to be understood that the nozzle 17 could equally well be located to spray fuel directly into the cylinder 16 downstream of the intake manifold 15.

The cylinder 16 having a piston 18 reciprocally moving therein is installed in the engine block having a crank-case 19. During engine operation, "blow-by" or gases resulting from combustion escape from a combustion chamber 20 in the cylinder 16 pass the piston 18 into the crank-case 19. Water and gasoline also appear in the crankcase 19 as a result of normal operation, and after the engine reaches the normal operating temperature, the water and gasoline evaporate. In order that the blow-by gases and the vapors might be discharged from the crankcase 19, the crankcase 19 is coupled to the throttle chamber 12 upstream of the throttle valve 13 by means of a connecting tube 21. As is best seen in FIG. 2, the connecting tube 21 has an orifice 22 so as to control the flow rate of blow-by gases and vapors passing therethrough. An idle circuit having a passage 23 through which a small amount of air can flow is provided in the casing of the throttle chamber 12. The air flow through the passage 23 is controlled by an idle adjustment screw 24.

Turning back to FIG. 1, the crankcase 19 is also coupled to the air cleaner 10 by means of another connecting tube 25. The purpose of the provision of the air passage 25 is to introduce fresh air into the crankcase 19 when a large amount of blow-by gases is fed back to the throttle chamber 12.

Under normal engine operating conditions, the blow-by gases and the water and gasoline vapors pass through the connecting tube 21 into the throttle chamber 12. From there, they are introduced into the engine as part of the air-fuel mixture and exit through the exhaust system (not shown). On the other hand, during idling or deceleration the throttle valve 13 is held in the fully closed position, so that the blow-by gases and the vapors are prevented from entering the cylinder 16. Under these conditions, only a small amount of blow-by gases and water and gasoline vapors is caused to flow through the connecting tube 25 into the air cleaner 10 by an extremely small negative pressure existing in the air cleaner 10. Thus, the amount of hydrocarbons emitted from the exhaust system is small in comparison with that of the existing system.

Figure 3A:
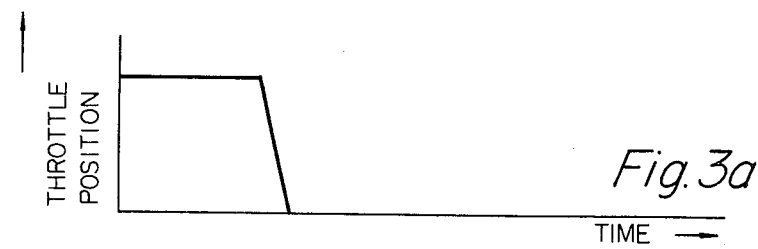
FIGS. 3(a) through (e) are diagrams explaining the operation and effect of the present crankcase ventilating system.
Figure 3B:
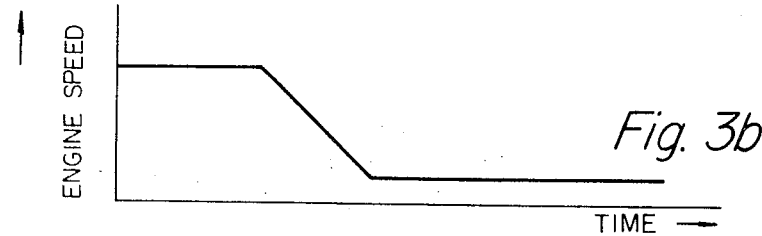
Figure 3C:
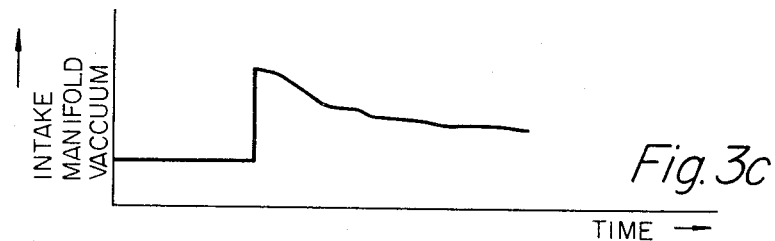
Figure 3D:
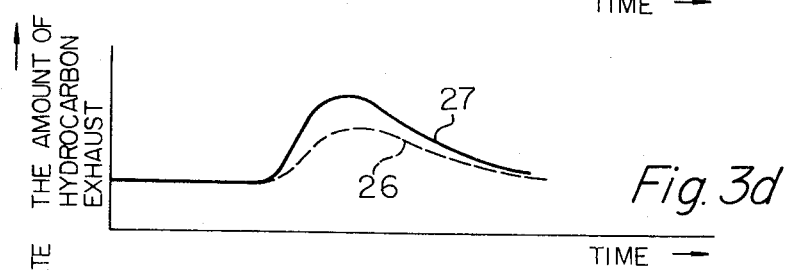
Figure 3E:
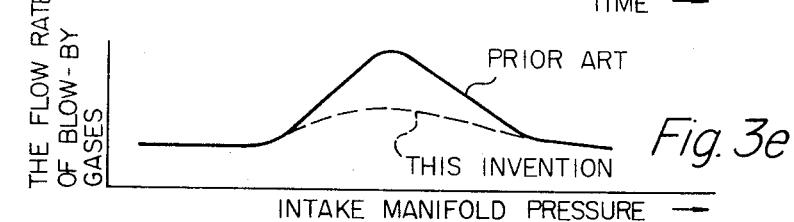

This is understandable in view of the diagrams of FIGS. 3(a), (b), (c), (d) and (e), which represent throttle position, engine speed, intake manifold vacuum, the amount of hydrocarbons in the exhaust gases and the flow rate of blow-by gases, respectively. Particular attention should be paid to FIG. 3(d) in which the broken line 26 represents the amount of hydrocarbons emitted from the engine having the present crankcase ventilating system, while the solid line 27 represents that from the existing system.

As has been described above, this invention provides a novel and improved crankcase ventilating system that is capable of effectively reducing the amount of hydrocarbons in exhaust gases during idling and deceleration and which is simple in construction.

What is claimed is:

1. In a fuel injection type internal combustion engine adapted for reducing the amount of unburned hydrocarbons in exhaust gases from said internal combustion engine during idling and decelerating conditions of said engine and having a throttle chamber, a combustion chamber and a crankcase, the improvement comprising, in combination, a throttle valve disposed in said throttle chamber and adapted to be fully closed during idling and decelerating conditions of said engine, an idle circuit having a passage formed in a casing of said throttle chamber for admitting a small amount of air into said combustion chamber during idling and decelerating conditions of said engine, and a connecting tube having one end connected to said crankcase and the other end connected to said throttle chamber upstream of said throttle valve to permit blow-by gases and fuel vapors in said crankcase to pass into said throttle chamber upstream of said throttle valve, said throttle valve preventing the blow-by gases and the fuel vapors passed into said throttle chamber from entering said combustion cylinder during idling and decelerating conditions of said engine.

2. The improvement according to claim 1, further comprising an orifice formed in said connecting tube to control the flow rate of said blow-by gases and said fuel vapors through said connecting tube.

3. The improvement according to claim 1, further comprising a connecting tube having one end connected to an air cleaner of said internal combustion engine and the other end connected to said crankcase for introducing fresh air from said air cleaner to said crankcase.

* * * * *